US008751472B2

(12) United States Patent
Mei et al.

(10) Patent No.: US 8,751,472 B2
(45) Date of Patent: Jun. 10, 2014

(54) USER BEHAVIOR MODEL FOR CONTEXTUAL PERSONALIZED RECOMMENDATION

(75) Inventors: Tao Mei, Beijing (CN); Ying-Qing Xu, Beijing (CN); Shipeng Li, Palo Alto, CA (US); Jinfeng Zhuang, Singapore (CN); Bo Zhang, Beijing (CN); Peng Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 183 days.

(21) Appl. No.: 13/111,132

(22) Filed: May 19, 2011

(65) Prior Publication Data

US 2012/0295640 A1    Nov. 22, 2012

(51) Int. Cl.
*G06F 17/30* (2006.01)
(52) U.S. Cl.
USPC ............ 707/706; 707/723; 707/724; 707/748
(58) Field of Classification Search
USPC ................ 707/722, 736, 748, 706, 723, 724; 709/203; 701/400, 426
See application file for complete search history.

(56) References Cited

U.S. PATENT DOCUMENTS

| | | | |
|---|---|---|---|
| 6,819,267 B1 * | 11/2004 | Edmark et al. | 709/203 |
| 2002/0052873 A1 * | 5/2002 | Delgado et al. | 707/7 |
| 2003/0036848 A1 * | 2/2003 | Sheha et al. | 701/209 |
| 2003/0135582 A1 | 7/2003 | Allen et al. | |
| 2003/0208485 A1 * | 11/2003 | Castellanos | 707/5 |
| 2006/0069504 A1 * | 3/2006 | Bradley et al. | 701/211 |
| 2006/0074883 A1 | 4/2006 | Teevan et al. | |
| 2009/0190739 A1 * | 7/2009 | McGary et al. | 379/218.01 |

OTHER PUBLICATIONS

Arias, et al. "Context Based Personalization for Mobile Web Search"—Published Date: Aug. 24-30, 2008 http://persdb08.stanford.edu/5-PersDB-Paper.pdf, 7 pages.
Discover Yours: Local recommendations powered by you and your friends—Retrieved Date: Jan. 5, 2011, http://google-latlong.blogspot.com/2010/11/discover-yours-local-recommendations.html, 1 page.

(Continued)

*Primary Examiner* — Vincent F Boccio
(74) *Attorney, Agent, or Firm* — Carole Boelitz; Micky Minhas; Lee & Hayes, PLLC

(57) ABSTRACT

A user behavior model provides personalized recommendations based in part on time and location, particularly to users of mobile devices. Entity types are ranked according to relevance to the user. Example entity types are restaurant, hotel, etc. The relevance may be based on reference to a large-scale database containing queries from other users. Additionally, entities within each entity type may be ranked based on relevance to the user and the time and location context. A user interface may display a ranked list of entity types, such as restaurant, hotel, etc., wherein each entity type is represented by a highest-ranked entity with the entity type. Thus, the user interface may display a highest-ranked restaurant, a highest-ranked hotel, etc. Upon user selection of one such entity type the user interface is replaced with a second user interface, for example showing a ranked hierarchy of restaurants, headed by the highest-ranked restaurant.

20 Claims, 7 Drawing Sheets

(56) References Cited

OTHER PUBLICATIONS

Google Mobile—Retrieved Date: Jan. 5, 2011 http://www.google.com/support/mobile/bin/answer.py?hl=en&answer=168595, 1 page.

Shin, et al., "Context-Aware Recommendation by Aggregating User Context"—Published Date: Jul. 2009 http://ieeexplore.ieee.org/stamp/stamp.jsp?tp=&arnumber=5210763, 8 pages.

Taptu Search on your Mobile—Retrieved Date: Jan. 5, 2011 http://www.taptu.com/about/products/taptusearch?ua=iphone, 3 pages.

Yahoo! Search for BlackBerry—Retrieved Date: Jan. 5, 2011 http://mobile.yahoo.com/search/blackberry, 2 pages.

Yingchen, et al. "Ontology-based Approach for Mobile Personalized Recommendation"—Published Date: Jul. 2009, http://ieeexplore.ieee.org/stamp/stamp.jsp?tp=&arnumber=5233279, 4 pages.

* cited by examiner

USER BEHAVIOR MODEL FOR CONTEXTUAL PERSONALIZED RECOMMENDATION

BACKGROUND

Mobile devices, such as Internet-connected cell phones and tablets, are increasingly popular. Such devices allow users to obtain information about businesses, events and facilities available to the user. In particular, the user can enter detailed customized searches queries into search engines, and receive in-depth information in response. In particular, the user can learn about restaurants, gas stations, hotels and other business, which can be useful both when traveling and when in one's own city.

However, to obtain such information, the user must enter detailed search parameters. Such parameters are required by search engines to provide search results that are useful. Thus, to provide useful search information, input search parameters must include sufficient detail. For example, search parameters may require an interest (e.g., food or lodging), a location (e.g., a city or neighborhood), a price range (e.g., economy or luxury) and other parameters. Even when specified to this degree, the output of the search may not be initially satisfactory, and the user may resort to an iterative session of searching.

Entry of any parameters in a mobile environment may be difficult for a user, particularly if the user is driving a car or is using a mobile device with a difficult user interface, or both. Accordingly, while a device having extensive capabilities may be available to the user, it may be difficult for the user to operate that device at precisely the time that it is most needed.

SUMMARY

Techniques for modeling user behavior and for providing personalized recommendations are described herein. The techniques describe modeling user input, typically obtained by operation of a mobile device, with other users. The input can be refined by inclusion of contextual information such as time and location and comparison of the user to other users. Thus, a preferred search term may be obtained and may provide personalized search results to the user.

A user behavior model provides personalized recommendations based in part on time and location, particularly to users of mobile devices. Entity types are ranked according to relevance to the user. Example entity types are restaurant, hotel, etc. The relevance may be based on reference to a large-scale database containing queries from other users. Additionally, entities within each entity type may be ranked based on relevance to the user and the time and location context. A user interface may display a ranked list of entity types, such as restaurant, hotel, etc., wherein each entity type is represented by a highest-ranked entity with the entity type. Thus, the user interface may display a highest-ranked restaurant, a highest-ranked hotel, etc. Upon user selection of one such entity type the user interface is replaced with a second user interface, for example showing a ranked hierarchy of restaurants, headed by the highest-ranked restaurant.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Figure 1:
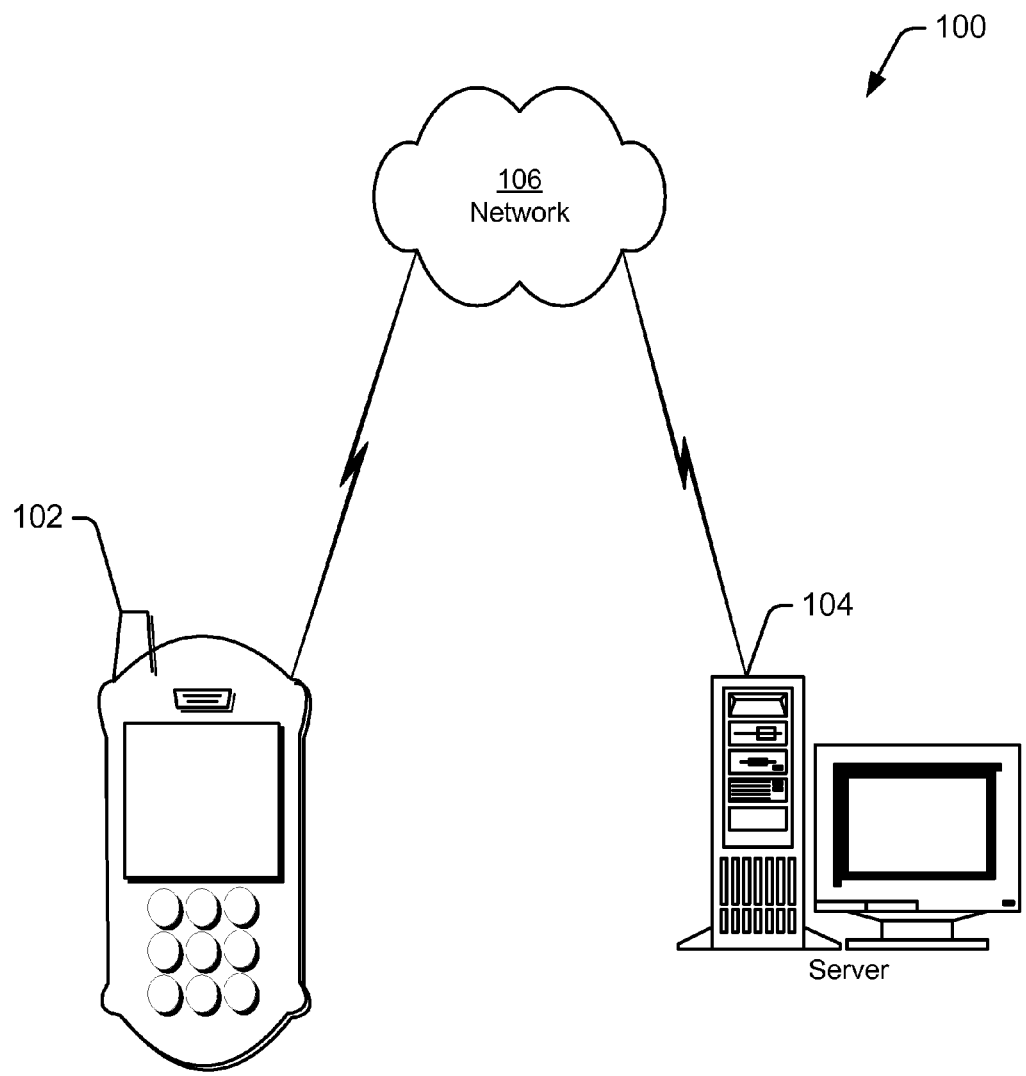
FIG. 1 is diagram illustrating an example system providing a user behavior model for personalized recommendation.

The disclosure describes examples of techniques for providing a user behavior model for personalized recommendation. The techniques describe examples by which a streamlined user interface (UI) may be presented to a user, such as a UI presenting only major categories or entity types, such as restaurant, hotel and others. Additional techniques describe examples by which user input may be supplemented with information obtained by the user's mobile device, such as the user's location and local time. Further techniques describe examples by which a ranking of entity types may be presented to the user. And still further techniques describe examples by which each ranked entity type may be represented by a highest-ranked entity from within the entity type.

An example illustrating some of the techniques discussed herein—not to be considered a full or comprehensive discussion—may assist the reader. Input may be obtained from a mobile device indicating context, such as location and time. Using this input, the user behavior model may create a ranking of entity types according to relevance to the user in view of the time and location context. Example entity types may be restaurant, hotel, shopping center, etc. The relevance may be based on reference to a large-scale database based on queries of other users. Additionally, entities within each entity type may be ranked based on relevance to the user and the time and location context. A user interface may display a ranked list of entity types, such as restaurant, hotel, etc., wherein each entity type is represented by a highest-ranked entity with the entity type. Thus, the user interface may display a highest-ranked restaurant, a highest-ranked hotel, a highest-ranked shopping center, etc. Upon user selection of one such entity type (e.g., selection of the highest-ranking restaurant) the user interface is replaced with a second user interface, showing a ranked hierarchy of restaurants, headed by the highest-ranked restaurant.

The discussion herein includes several sections. Each section is intended to be non-limiting. More particularly, this entire description is intended to illustrate components which may be utilized in providing a user behavior model for contextual personalized recommendations, but not components which are necessarily required. The discussion begins with a section entitled "Example Recommendation Architecture," which describes one environment that may implement the techniques described herein. This section depicts and describes a system to provide personalized recommendations, particularly to users of mobile devices, at a high-level architecture. Next, a section entitled "Example User Interfaces" illustrates and describes aspects that can be used to provide information to users, particularly users of mobile devices requiring a simplified interface. A third section, entitled "Example Flow Diagrams" illustrates and describes techniques that may be used to implement an example of a user behavior model that provides personalized recommendations. Finally, the discussion ends with a brief conclusion.

This brief introduction, including section titles and corresponding summaries, is provided for the reader's convenience and is not intended to limit the scope of the claims or any section of this disclosure.

Example Recommendation Architecture

FIG. 1 is diagram illustrating an example system 100 providing a user behavior model for personalized recommendation. As an example, FIG. 1 illustrates generalized concepts, but does not indicate required and/or necessary elements. A mobile device 102 is configured to allow a user to provide input to, and receive output from, a search engine, content provider or generalized server 104 (hereinafter referred to as "server 104"). The mobile device 102 may be any type of mobile telephone, tablet, computing device, etc. The mobile device 102 may communicate with the server 104 over a network 106, such as the Internet, a propriety network or other networking system, such as by wired or wireless signals, packets or other messaging technologies.

In the example of FIG. 1, input may be obtained from the user of the mobile device 102, such as by operation of simplified user interface that may be utilized quickly and that involves minimal demands on the user. In one example, the user interface may provide a list of search terms from which the user may choose. Such a list frees the user from the task of thinking of, and typing in, such search terms. The input may be sent by the mobile device 102 to the server 104, where it may be used to search a query database, and to thereby obtain a query set of possible queries for submission to a search engine. The search engine may be unified with, or distinct from, the server 104. Because the server 104 may include, or have access to, a large-scale query database, the server may be configured to calculate a measure of similarity between the user operating mobile device 102 and other users operating other mobile devices and/or having previously submitted queries. Thus, each query in the query set may be weighted according to a measure of similarity between the user of the mobile device 102 and a user associated with that query in the query set. The weighting may also include aspects of a frequency of the query in a query history of the user associated with the query. Using the weights applied to the queries in the query set, a query may be selected. Search results from the query may be displayed to the user on the mobile device 102.

Figure 2:
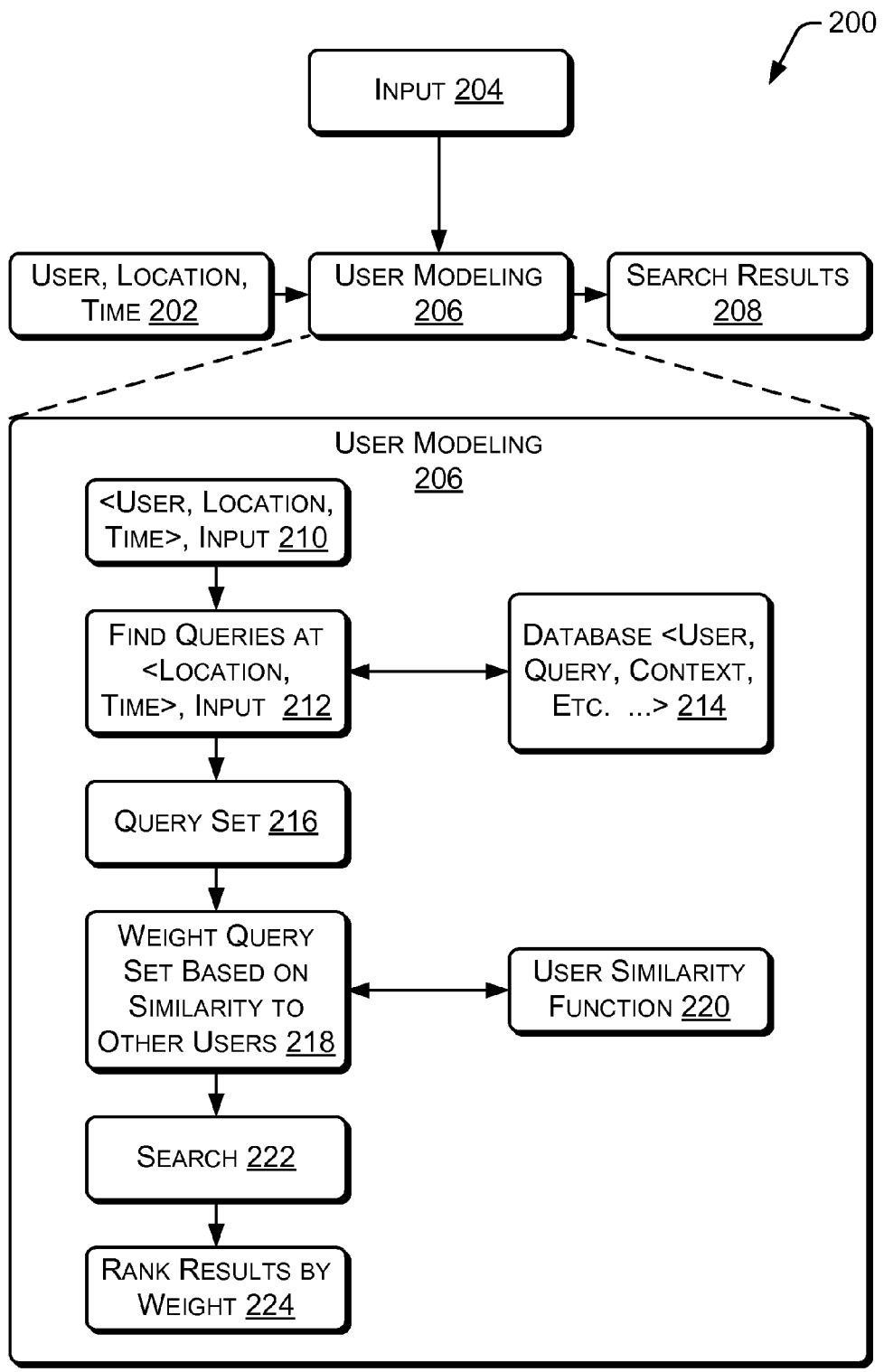
FIG. 2 is a diagram illustrating a further example system, particularly showing details of how user modeling is performed.

FIG. 2 is a diagram illustrating a further example system 200, particularly showing details of how user modeling is performed and how a contextual personalized recommendation may be provided to a user. As a further example, FIG. 2 illustrates generalized concepts, but does not indicate required and/or necessary elements. At block 202, information on the user and/or user ID, location and time is provided. In the example of FIG. 1, the mobile device 102 may provide information including an identification of the user, a location of the user and a local time of the user. This information may be provided at the direction of the user or by automatic operation of the mobile device. The location may be provided in a generalized manner, such as by an indication of a particular cellular telephone tower, or may be provided in a much more detailed manner, such as by an indication provided by a global positioning system (GPS).

At block 204, additional input may be provided. The input may include an indication of information desired by the user of a mobile device. In one example, the input may be entered into a streamlined and/or simplified user interface. The input may be in response to needs of the user, such as for help in locating goods or services in broad categories, such as shopping, food, lodging, gasoline and others.

At block 206, user modeling may be utilized to evaluate the input received from blocks 202, 204. In one example, the user modeling 206 obtains a query set, evaluates the user (e.g., the user of the mobile device 102 of FIG. 1) for similarity to a user associated with each of the queries in the query set, and utilizes the user similarity to select a query from the query set for use in a search. The search results 208 are then provided to the user, such as by display on the mobile device (e.g., mobile device 102 of FIG. 1).

Blocks 210-224 provide one example of the user modeling of block 206, and are therefore illustrative of general concepts, but do not indicate required elements. At block 210, the inputs of blocks 202 and 204 may be combined. In particular, the user's identification, the location of the user and the local time of the user may be combined with the generalized or broad input obtained from the user at block 204. At block 212, a plurality of queries, such as a query set 216, are obtained, based at least in part on the input of block 210. The queries may be obtained from a large-scale query database 214. Thus, the query set 216 includes a plurality of queries that may be appropriate for submission to a search engine, which may provide search results consistent with a desire of the user.

The database 214 may include a large number of queries, and may be searchable based on user ID, location, time and generalized or categorical input, e.g., the inputs obtained at blocks 202 and 204. The queries are generally appropriate for use in a search engine, and are typically in the form of short word or text strings. However, other types of queries could be contained in the database 214, if desired.

At block 218 the query set 216 obtained at block 212 is weighted. The weighting may be performed in any desired manner, to obtain one or more preferred queries. In one example, at block 220 a user similarity function may be used to determine which other uses are similarly situated to the user (e.g., the user of the mobile device 102 of FIG. 1). Thus, the weighting may be performed by pairing the user to a user associated with each query in the query set, and determining a similarity (e.g., pair-wise similarity) of the users. Thus, each query in the query set 216 may be assigned a weight, and the weights may be associated with similarity between the user of the mobile device and other users associated with queries in the query set. Accordingly, a query may be selected from among those in the query set, and the selection may be based on the weighting performed at block 218.

At block 222, a search may be performed. In one example, the search may be made by submitting the query selected from the query set 216, or other plurality of queries, to a search engine. At block 224, the output may be provided to the user of the mobile device, such as in a ranked form according to a weight of each element of the output.

Example User Interfaces

Figure 3A:
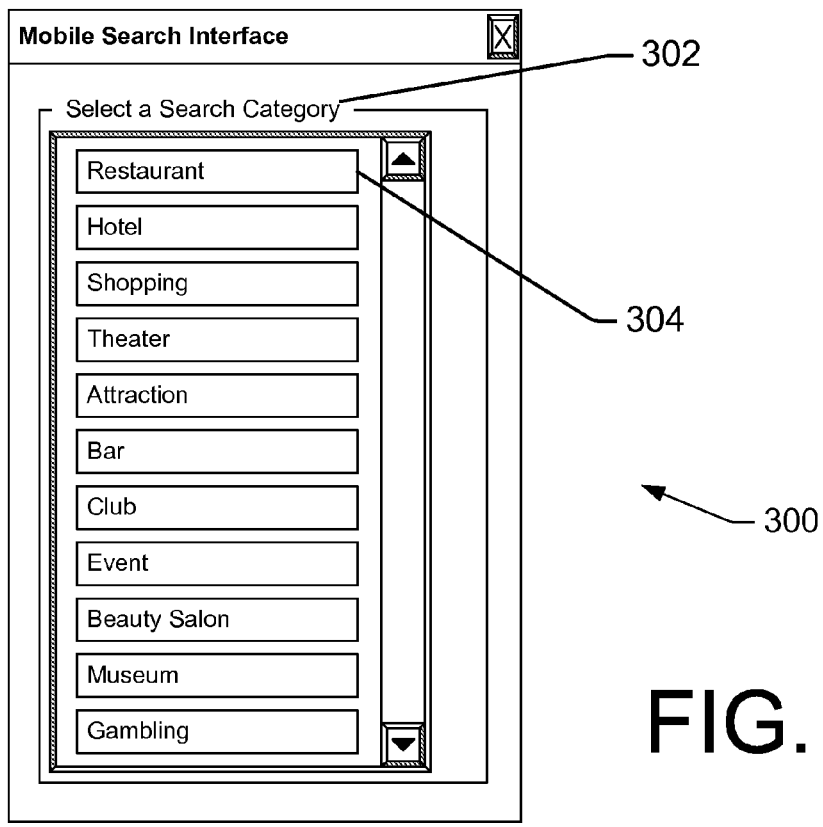
FIGS. 3A and B show user interfaces, and are examples showing how a user may enter search parameters.

FIG. 3A is a user interface (UI) 300, illustrating an example by which a user may enter search parameters, such as indicating an entity type or search category desired. In the example shown, an instruction may be provided to the user, such as instruction 302, indicating that the user is to select an entity type (i.e., a search category, such as restaurant or hotel). A plurality of entity types may be provided, such as representative entity type 304, indicating "restaurant." Thus, a user wanting to view search results related to restaurants would click or press entity type 304, associated with restaurants. Other representative and/or example entity types are represented by inputs for hotels, shopping, theaters and others. Thus, a user of a mobile device (e.g., device 102 of FIG. 1) is able to provide input to a searching process using a streamlined user interface 300 that does not require difficult or time-consuming actions on the part of the user.

Figure 3B:
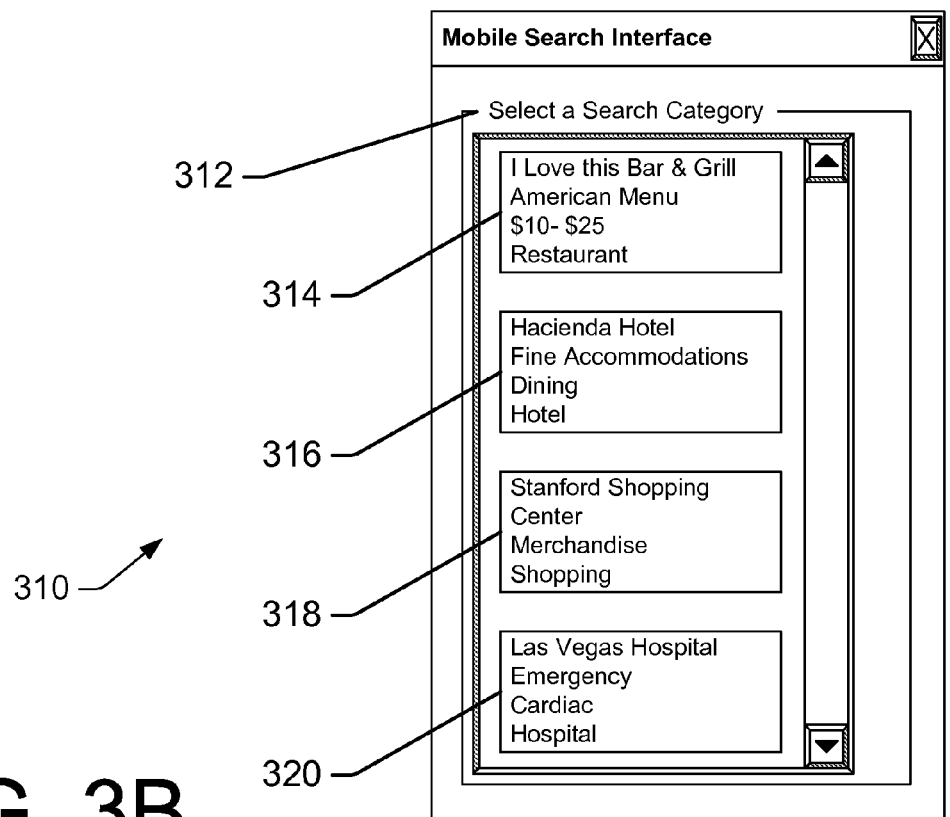

FIG. 3B is an example user interface (UI) 310, configured to illustrate a second example by which a user may enter search parameters, and thereby enter a desired entity type. In the example shown, an instruction may be provided to the user, such as instruction 312, indicating that the user may select an entity type 314. However, the entity type 314 (e.g., a search category) may also indicate a first result of that search. For example, the "I Love This Bar & Grill" entity 314 is an icon that serves dual purposes. First, it represents an icon for restaurant searching generally. That is, by selecting the "I Love This Bar & Grill" icon, the user provides a search parameter, indicating entity type, for a search for restaurants generally. Secondly, the "I Love This Bar & Grill" icon, (and other icons shown 316-320), represent partial or initial search results for the search parameters represented by each icon. Thus, the "I Love This Bar & Grill" icon 314 is an input search parameter usable to search for restaurants, and is also a first output for such a search. Similarly, the Hacienda Hotel icon 316 is an input search parameter for hotels generally, and is also a first output element for a search on hotels. Accordingly, the user interface of FIG. 3B is extremely streamlined, at least because it anticipates both common desired entity types (e.g. restaurant) and also anticipates search results (e.g., "I Love This Bar & Grill"). Thus, the entity types are ranked according to user relevance, such as by operation of a user model. Moreover, within each entity type, the most relevant entity (e.g., the restaurant named "I Love This Bar & Grill") will be shown as the representative or highest-ranked entity in this type. When the user clicks one entity type (e.g. icon 314) all the entities in this type will be displayed (see, for example, FIG. 4B). In one example, the entities are ranked according to the relevance scores from the user model, such as in a descending order. The relevance scores may be based in part on distance to user, critic's rating, or other criteria. In this way, users can get helpful recommendations consistent with their preferences without little or no input.

Figure 4A:
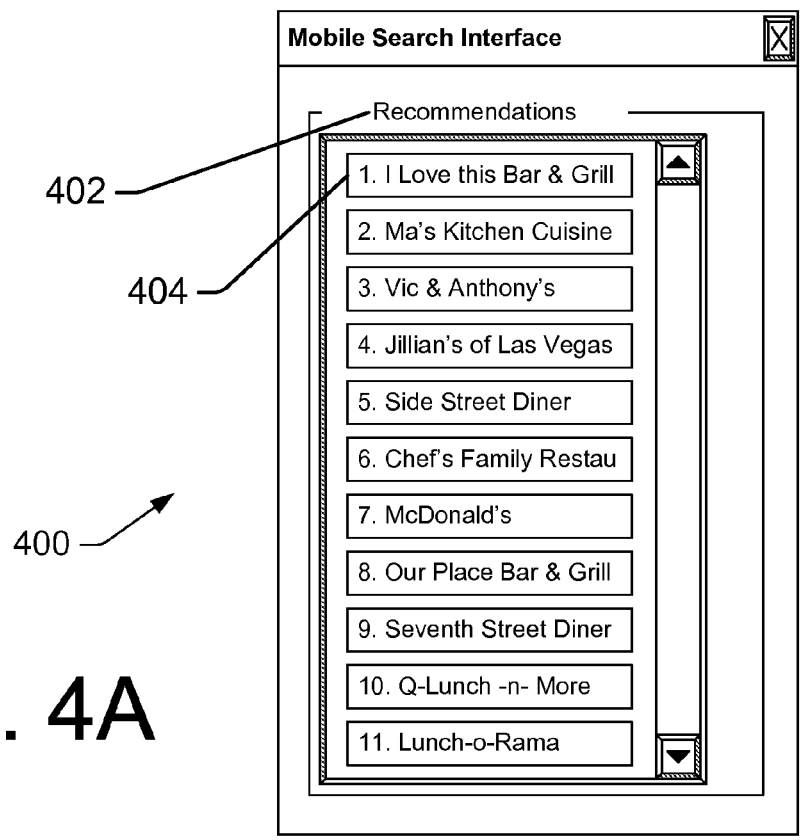
FIGS. 4A and B show user interfaces, and are examples showing how search results may be communicated to the user.

FIG. 4A is an example of a user interface (UI) 400, configured to illustrate an example by search results may be communicated to the user. In the example shown, a caption may be provided to the user, such as caption 402, indicating that the user has been provided with a number of entity names (i.e., specific recommendations consistent with the selected entity type or search category). Below the caption 402, a number of elements are included in the search results. For example, one entity name 404 indicates a search result that is a particular restaurant called "I Love this Bar & Grill." Thus, the search results provide the user with a plurality of entity names, from which the user may choose a preferred result.

Figure 4B:
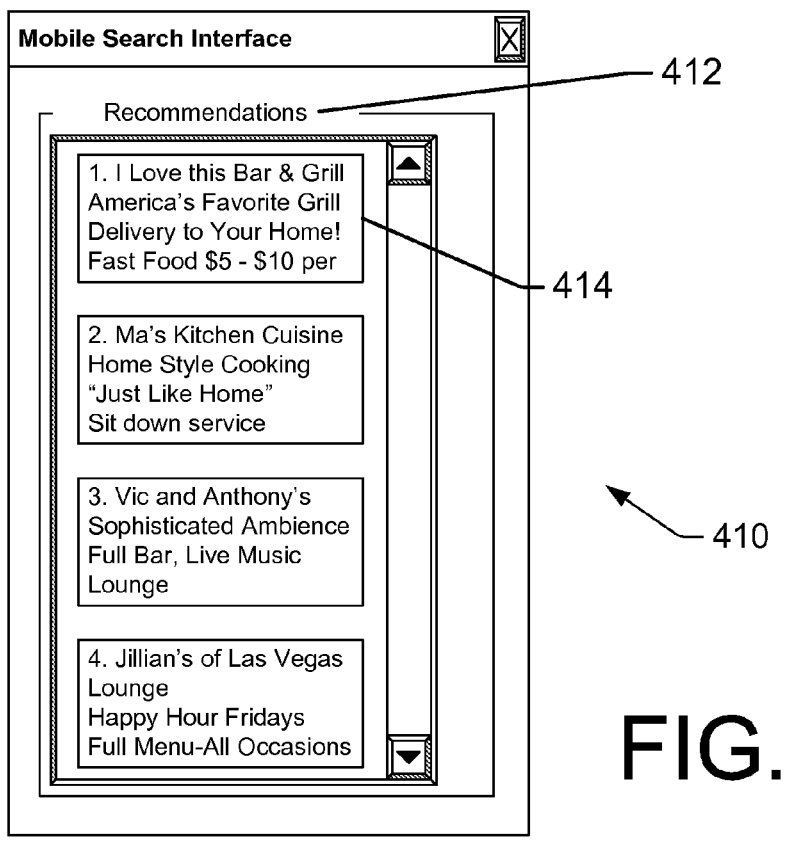

FIG. 4B is a second example of a user interface (UI) 410, configured to provide more in-depth information about each entity name than is provided by the example interface of FIG. 4A. Thus, the example of FIG. 4B provides more information to the user about a smaller number of entity names. By extension, each entity name could be provided additional detail, and allowed to fill the entire screen of the mobile device.

Example Flow Diagrams

The example systems 100, 200 may have additional features and/or functionality. For example, the example systems 100, 200 may include computer- and/or processor-readable data storage device. Such storage may include removable storage and/or non-removable storage. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by a mobile device 102, a computer and/or server 104 or other component. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

Figure 5:
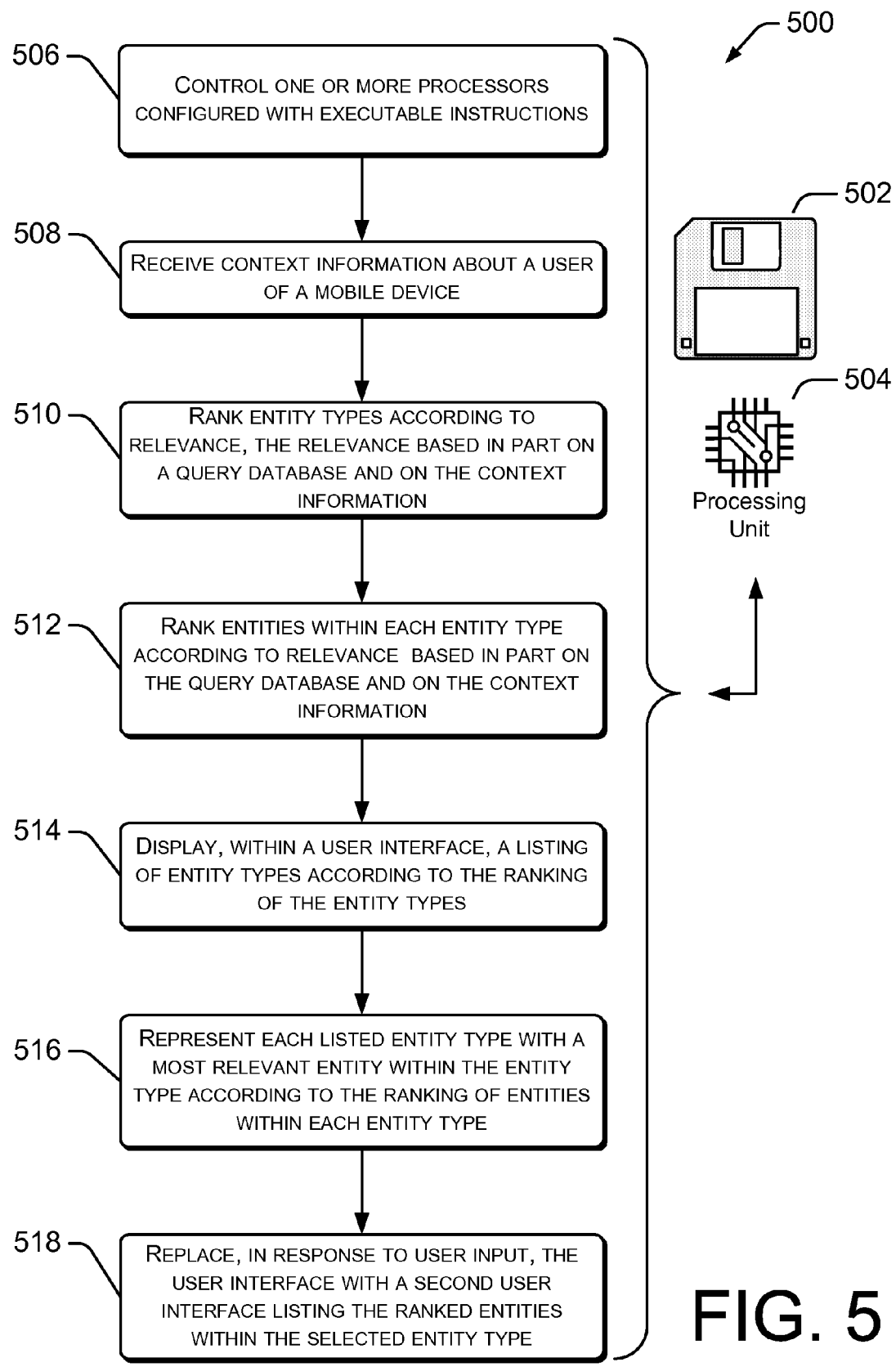
FIGS. 5 and 6 are flow diagrams illustrating example processes for modeling user behavior to provide a personalized recommendation within a context.

FIG. 5 is a flow diagram illustrating an example process 500 for modeling user behavior to provide a personalized recommendation within a context, such as time and/or location, etc. The example processes of FIGS. 5 through 7 can be understood in part by reference to the configurations of FIGS. 1-4. However, FIGS. 1-4 contain general applicability, and are not limited by other drawing figures and/or prior discussion. In one example, the processes of FIGS. 5 and 6 may be defined on computer- and/or processor-readable memory 502 and executed by a processing unit 504. For example, at operation 506, one or more processors may store, in a memory communicatively coupled to a processor, computer-executable instructions for performing the method discussed herein, including performance of the operations of operations 508-518. The processing may be performed on the mobile device 102, a server 104 (see FIG. 1) or other location as indicated by particular needs.

At operation 508, contextual information is received from the user and/or the user's mobile device. In one example, a cellular telephone or other mobile device automatically provides contextual information, including a location of the user and/or user's device and a local time at the location.

At operation 510, entity types are ranked according to relevance to the user and/or the user's circumstances. Entity types can include business groupings, such as restaurants, hotels, shopping centers, museums, bars, theaters, clubs, beauty salons, casinos and any other type of "entities," i.e., business, club, organization, landmark, attraction, etc. The relevance (e.g., relevance to the user and/or user's circumstances) may be measured at least in part with respect to a comparison of the user to a mass of other uses, and their associated user behaviors. Such a mass of data may be formed by logs of queries made by a large number of users over time, and may be indexed for constraints, such as time, locations and others, as desired. An example of such data is seen in FIG. 2 as database 214. In one example, operation 510 ranks entity types (e.g. types of businesses, organizations, landmarks and others). The ranking attempts to anticipate the needs of the user by ranking the entity type (e.g. restaurant) that it is anticipated that is of greatest present concern to the user. Thus, the example output of the entity ranking may be "restaurant, hotel, shopping, etc." This assists the user by attempting to provide the most wanted information in a preferred or prominent location.

At operation 512, entities within one or more (typically each) entity type are ranked. Again, the ranking may be made according to relevance to the user and/or the user's circumstances, day/date/time and location. And again, the relevance may be measured at least in part based on a comparison to a mass of user data, such as database 214 of FIG. 2. In one example, operation 512 ranks entities to thereby create a hierarchy of entities in each entity type. Thus, all restaurants would be ranked. Similarly, all hotels would be ranked. And further, all shopping centers would be ranked, etc.

At operation 514, a user interface is displayed showing entity types according to the ranking of operation 510. In one example, FIG. 3A shows a user interface showing eleven types of entities, ranked with restaurant first, hotel second, etc.

Operation 516 provides a variation on operation 514, wherein each listed entity type in a user interface may be represented by a most relevant entity within the entity type. The most relevant may be selected according to the ranking of operation 512. Thus, as seen in the example of FIG. 3B, the "restaurant" entity type is replaced by a highest-ranked restaurant, "I Love this Bar & Grill." Similarly, the "hotel" entity type is replaced by a highest-ranked hotel, the "Hacienda Hotel." Advantageously, the user interface of FIG. 3B provides a user with a listing of the highest-ranked entity types, with each entity type represented by a highest-ranked entity having that entity type.

At operation 518, in response to user input (such as selection of one of the entity types as represented by the highest-ranked entity in the entity type) the user interface may be replaced with a second user interface, listing the ranked entities within the selected entity type. In a first example, if the "restaurant" selection 314 of user interface 300 of FIG. 3A is selected, then it is replaced with the user interface 400 of FIG. 4A, which shows a ranking of restaurants. In a second example, if the highest-ranked restaurant "I Love this Bar & Grill" 314, representing the highest-ranked entity type, is selected in FIG. 3B, then that user interface is replaced by a second user interface such as user interface 410 of FIG. 4B. Thus, if the user does not prefer the highest-ranked restaurant in that entity type (restaurants) the user may consider other restaurants in ranked order, such as in FIGS. 4A or 4B.

Figure 6:
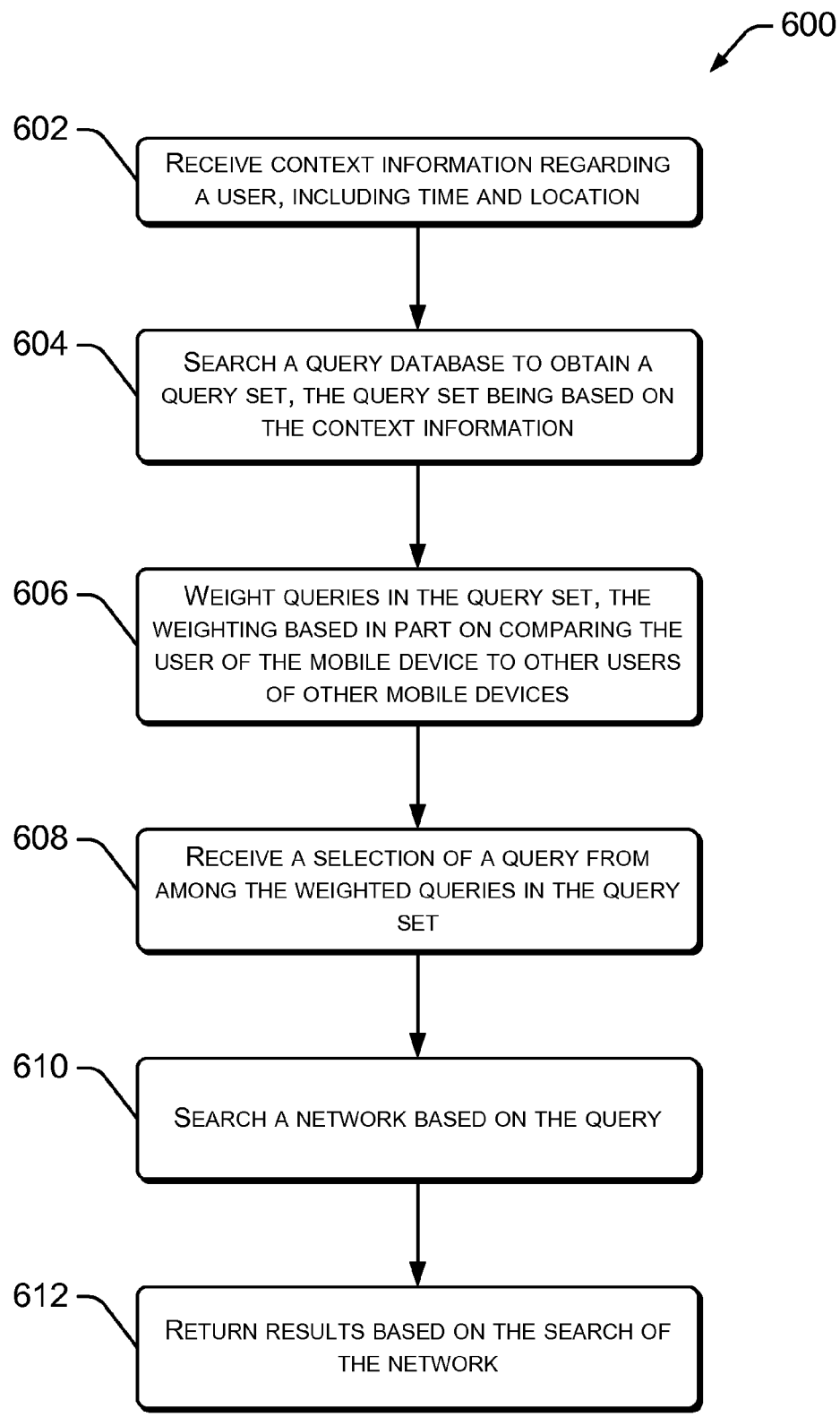

FIG. 6 is a flow diagram illustrating an example process 600 for modeling user behavior to provide a personalized recommendation within a context, such as time, day, date, season, and/or location, etc. At operation 602, contextual information is received. As noted with respect to block 508 of FIG. 5, this may include time, location or other information as indicated by the needs of a particular application.

At operation 604 a database is searched to obtain a query set. In one example, the query set includes a plurality of queries, each query a possible match to produce search results satisfactory to the user. The query set 216 (see FIG. 2) is one possible example, which may be obtained from the query database 214. The query set and query database may include queries recorded in response to input by a large mass of users over some time. The query database may include queries intended to fit circumstances of a plurality of different users of different mobile devices. Searching the query database may result in a different query set depending on variables, such as a location of the user and a local time of the user.

At operation 606, queries in the query set are weighted. In one example, the weighting may be based at least in part on a comparison of the user of a mobile device (e.g., the user of mobile device 102 of FIG. 1) to one or more users associated with each of the queries in the query set. Thus, if a query in the query set was made or presented at one time by a user found to have high similarity to the user of the mobile device, then that query may be weighted high. In contrast, if a query in the query set was presented at one time by a user found to have little similarity to the user of the mobile device, then that query may be weighted low.

In one example, the computation of user similarity may be made according to two steps. First, a tf-idf (term frequency-inverse document frequency) weighting may be made over queried entities (e.g., entities returned in search results) of a user to represent the user. Accordingly, prior search results of two users may be used to measure similarity between the two users. Second, additionally or alternatively to the tf-idf weighting, cosine similarity may be used to compute a similarity (e.g., a similarity graph) between two users. In a further example, the computation of user similarity may be performed according to one or more of the aspects discussed with respect to FIG. 6. Accordingly, a ranking of entity types and/or a ranking of entities within entity types, such as for a particular user, may be based in part on similarity of the user of the mobile device to other users of other mobile devices, and may be measured in part by tf-idf weighting and/or cosine similarity.

At operation 608, a query is received, such as by user selection, from among the queries of the query set. Note that within this document, a query (represented as query "q" in examples below) may be configured and/or represented in any format, media or configuration desired. For example, while a textual query may be used, audio, video, symbolic or other formats may be used to create the query. Moreover, the query log database (e.g., 214 at FIG. 2) may be used to store any query format, type or kind. Additionally, specific user operation or behavior when using the mobile devices (e.g., adding an entity into a favorite list, subscribing to a service using one or more particular applications) may constitute a "constructive query" and be used as input when ranking entities and or entity types (such as in FIG. 5) and may be stored for consideration in a query database. The selection may be made according to the weighting of operation 606.

At operation 610, a network is searched according to the selected query. For example, the query may be submitted to a search engine, and a search may be made of the Internet.

At operation 612, results are returned to the user based on the search of the network made at operation 610. In one example, the results are displayed in the user interface 400 of FIG. 4.

Figure 7:
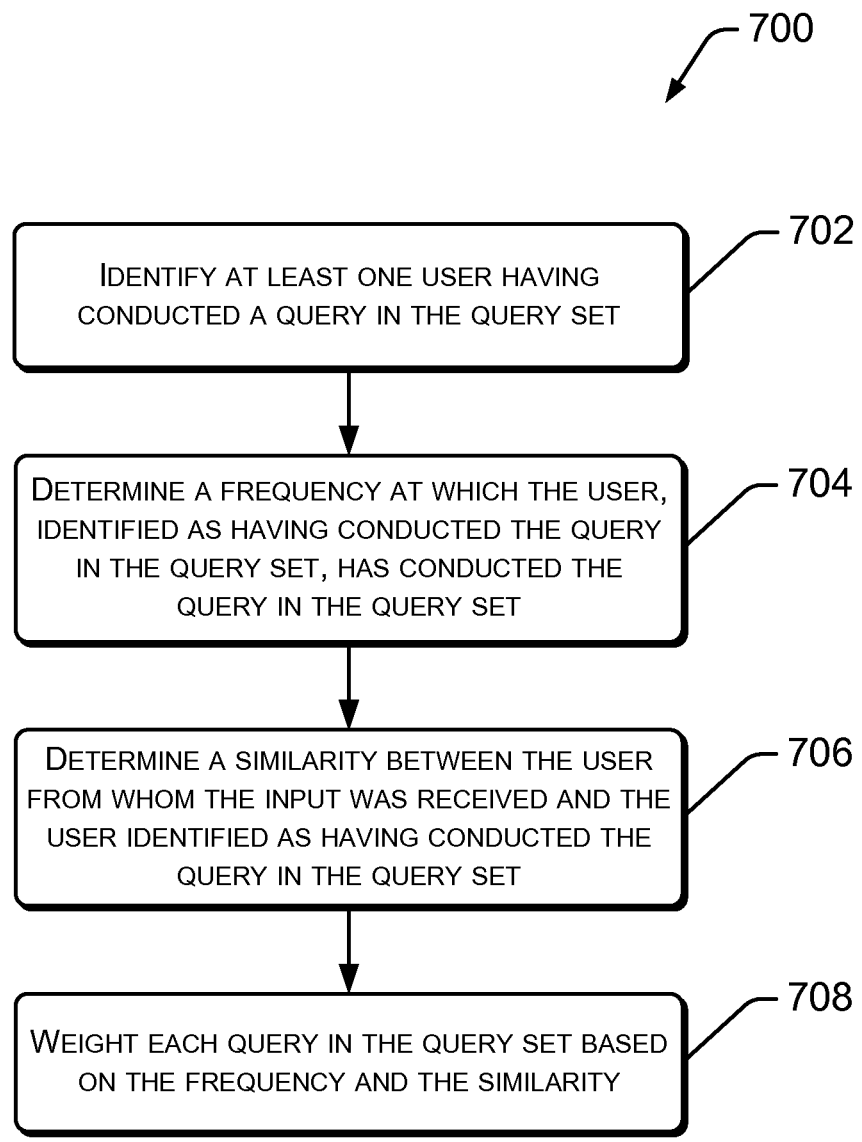
FIG. 7 is a flow diagram illustrating a plurality of example operations by which user similarity and query weight may be determined.

FIG. 7 is a flow diagram illustrating an example process 700 by which queries within a query set, query frequency and user similarity may be weighted. Accordingly, FIG. 7 expands on the weighting concepts discussed with respect to operation 606 of FIG. 6. Thus, FIG. 7 is intended to illustrate a number of concepts or processes, which can be performed singly and/or in combination with others of the example processes.

At operation 702, at least one user associated with one of the queries in the query set is identified. For example, the query database may identify a user who previously submitted one of the queries selected (at operation 608) to be in the query set.

At operation 704, a frequency is determined at which the user, who was identified as having conducted a query in the query set, has conducted that query in the query set. This frequency may be written as f (q, u(q)), where f is the frequency, q is the query, and u(q) is the user who has conducted the query found in the query set.

At operation 706, a similarity is determined between the user from whom the input was received (e.g., the user of mobile device 102 in FIG. 1) and the user identified as having conducted the query in the query set (e.g., the user identified at operation 702). The similarity may be based on any number of factors that are known, and which may be available (e.g., in database 214 in FIG. 2). Such factors may include ages of the users, income levels of the users, home neighborhoods of the users, etc. The similarity of the users may be written as G(û, u(q)). Using this notation, G is a weighting function. The user û provided the input (e.g. the user operating the mobile device 102 of FIG. 1). The user u(q), is a user who has conducted the query q, for example a user who has conducted a query q found in the query set.

At operation 708, each query in the query set may be weighted. This may be done, using the above notation, according to:

$$w(q) = \Sigma_{u(q)} f(q, u(q)) * G(\hat{u}, u(q)).$$

Accordingly, each query in the query set may be weighted by summing a product having two terms, a first term being a function of a frequency of a query conducted by a user who has conducted the query and a second term being a function of a similarity between the user from whom input was received and the user who has conducted the query. Thus, by weighting each query q in the query set, a query may be selected according to the weight, and used in a search, such as in a manner indicated by the discussion of FIG. 5 or 6. Additionally, the weight associated with one or more queries, w(q), in the query set or database 214 (FIG. 2) may be used to measure or weigh the relevance to the user of entities, entity types, ranked entities within an entity type, and ranked entity types. In one example, the relevance to the user of entities and entity types may be based in part on weighting queries within the query database, wherein the queries are associated with entities within each entity type.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   receiving context information about a user;
   ranking entity types according to relevance to the user, the relevance to the user of the ranked entity types based in part on mass user behavior defined within a query database and based in part on the context information;
   ranking entities within each entity type according to relevance to the user, the relevance to the user of ranked entities within each entity type based in part on mass user behavior defined within the query database and based in part on the context information;
   representing each entity type with a most relevant entity within a respective entity type according to the ranking of entities within the respective entity type for display at a user interface; and
   displaying, within the user interface, a listing of most relevant entities according to a ranking of entity types corresponding to the most relevant entities in the listing respectively.

2. The method as recited in claim 1, wherein receiving context information comprises receiving a location of the mobile device of the user and a local time at the location.

3. The method as recited in claim 1, further comprising:
   receiving input including selection of one of the listed entity types; and
   replacing the user interface with a second user interface listing the ranked entities within the selected entity type.

4. The method as recited in claim 3, further comprising:
   receiving input including selection of one of the listed ranked entities within the selected entity type.

5. The method as recited in claim 1, wherein ranking entity types and ranking entities within each entity type is based in part on similarity of the user of the mobile device to other users of other mobile devices, and is measured in part by:
   a term frequency-inverse document frequency (tf-idf) weight to determine similarity between the user from whom input was received and the users who submitted searches stored in the query database; or
   a cosine similarity function to determine similarity between the user from whom input was received and the users who submitted searches stored in the query database.

6. The method as recited in claim 1, wherein the relevance to the user of ranked entity types and ranked entities within an entity type is based in part on weighting queries within the query database, the queries associated with entities within each entity type, wherein and the weighting is based in part on:

$$w(q) = \sum_{u(q)} f(q, u(q)) * G(\hat{u}, u(q))$$

wherein w is a weighting function, q is a query, user u has conducted the query q, user û provided the input, f is a function of a frequency of the query q in a history of the user u, and G is a function measuring similarity between the user û and user u(q), who has conducted the query q.

7. The method as recited in claim 1, wherein the relevance to the user of ranked entity types and the relevance to the user of ranked entities within an entity type are based in part on weighting queries within the query database, and wherein the weighting is based in part on summing a product having two terms, a first term being a function of a frequency of a query conducted by a user who has conducted the query and a second term being a function of a similarity between the user from whom input was received and the user who has conducted the query.

8. The method as recited in claim 1, wherein the relevance to the user of ranked entity types and the relevance to the user of ranked entities within an entity type are based in part on weighting queries within the query database, and wherein the weighting is based in part on:
   identifying at least one user having conducted a query in the query database;

determining a frequency at which the user identified as having conducted the query in the query database has conducted the query in the query database;

determining a similarity between the user from whom the input was received and the user identified as having conducted the query in the query database; and weighting each query in the query database based on the frequency and the similarity.

9. The method as recited in claim 1, wherein the relevance to the user of ranked entity types and the relevance to the user of ranked entities within an entity type are based in part on weighting queries within the query database, the queries associated with entities within each entity type, and wherein the weighting is based in part on:

a frequency at which a user who has conducted the query has executed the query; and a similarity between the user who has conducted the query and the user from whom the input was received.

10. One or more computer storage media storing computer-executable instructions that, when executed, cause one or more processors to perform acts comprising:

controlling the one or more processors configured with executable instructions to perform:

receiving context information about a user of a mobile device including a local time of the user and a location of the user;

ranking entity types according to relevance to the user, the relevance to the user of the ranked entity types based in part on mass user behavior defined within a query database and based in part on the context information;

ranking entities within each entity type according to relevance to the user, the relevance to the user of ranked entities within each entity type based in part on mass user behavior defined within the query database and based in part on the context information;

displaying, within a user interface, a listing of entity types according to the ranking of the entity types, a first entity type in the listing being distinct from a second entity type in the listing;

representing the first entity type in the listing with a first most relevant entity within the first entity type according to a ranking of entities within the first entity type at the user interface; and representing the second entity type in the listing with a second most relevant entity within the second entity type according to a ranking of entities within the second entity type at the user interface.

11. The one or more computer storage media as recited in claim 10, wherein the listing of entity types according to the ranking of the entity types is based in part on the local time of the user and the location of the user.

12. The one or more computer storage media as recited in claim 10, wherein the query database comprises queries fitting circumstances of a plurality of different users of different mobile devices.

13. The one or more computer storage media as recited in claim 10, wherein the acts further comprise:

receiving input including selection of one of the listed entity types; and replacing the user interface with a second user interface listing the ranked entities within the selected entity type.

14. The one or more computer storage media as recited in claim 10, wherein the acts further comprise:

receiving input including selection of one of the listed ranked entities within the selected entity type.

15. The one or more computer storage media as recited in claim 10, wherein ranking entity types and ranking entities within each entity type is based in part on similarity of the user of the mobile device to other users of other mobile devices, and is measured in part by:

a term frequency-inverse document frequency (tf-idf) weight to determine similarity between the user from whom input was received and the users who submitted searches stored in the query database; or a cosine similarity function to determine similarity between the user from whom input was received and the users who submitted searches stored in the query database.

16. The one or more computer storage media as recited in claim 10, wherein ranking entity types and ranking entities within each entity type is based in part on a weighting of queries in the query database, and is measured in part by:

$$w(q) = \sum_{u(q)} f(q, u(q)) * G(\hat{u}, u(q))$$

wherein w is a weighting function, q is a query, user u has conducted the query q, user û provided the input, f is a function of a frequency of the query q in a history of the user u, and G is a function measuring similarity between the user û and user u(q), who has conducted the query q.

17. The one or more computer storage media as recited in claim 10, wherein each query in the query database is weighted, for use in ranking the entity types and ranking the entities within each entity type.

18. The one or more computer storage media as recited in claim 10, wherein the relevance to the user of ranked entity types and ranked entities within an entity type is based in part on weighting queries within the query database, the queries associated with entities within each entity type, and wherein the weighting is based in part on:

a frequency at which a user who has conducted the query has executed the query; and a similarity between the user who has conducted the query and the user from whom the input was received.

19. A method to model user behavior for contextual personalized recommendation, comprising:

controlling the one or more processors configured with executable instructions to perform:

receiving input, the input being based in part on a selection made from a list of options by a user of a mobile device and based in part on a current context, the list of options being displayed on a screen of the mobile device and being based in part on options available at a local time of the user and a location of the user;

searching a query database to obtain a query set based on the input, the query database including queries intended to fit circumstances of a plurality of different users of mobile devices;

weighting queries in the query set, the weighting based in part on comparing the user of the mobile device to other users of other mobile devices, the comparing being based in part on:

identifying at least one user having conducted a query in the query set;

determining a frequency at which the user identified as having conducted the query in the query set has conducted the query in the query set;

determining a similarity between the user from whom the input was received and the user identified as having conducted the query in the query set; and weighting each query in the query set based on the frequency and the similarity;

selecting a query from among the weighted queries in the query set;

searching a network based on the selected query; and returning results based on the search of the network.

20. The method as recited in claim 19, wherein weighting queries in the query set comprises:

a term frequency-inverse document frequency (tf-idf) weight to determine similarity between the user from whom input was received and the users who submitted searches in the query set; and a cosine similarity function to determine similarity between the user from whom input was received and users who submitted searches in the query set.

* * * * *